F. FAIRBANKS.
Scale Platform.
No. 199,811.   Patented Jan. 29, 1878.
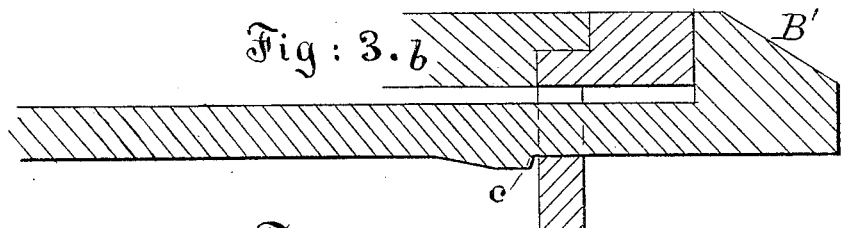
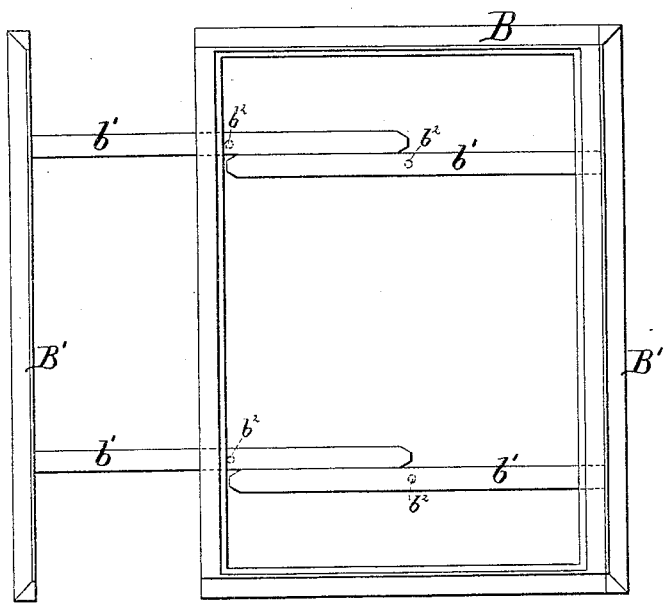
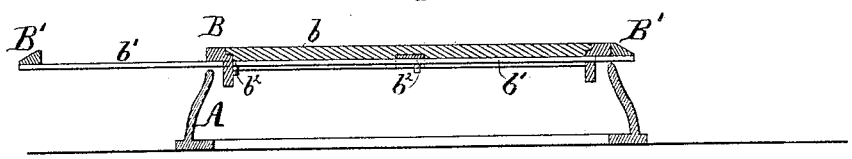
Witnesses:
A. H. Gerstner
H. A. Johnstone
Inventor:
Franklin Fairbanks
by his attorney
Thomas D. Stetson
New York

UNITED STATES PATENT OFFICE.

FRANKLIN FAIRBANKS, OF ST. JOHNSBURY, VERMONT.

IMPROVEMENT IN SCALE-PLATFORMS.

Specification forming part of Letters Patent No. 199,811, dated January 29, 1878; application filed September 28, 1877.

*To all whom it may concern:*

Be it known that I, FRANKLIN FAIRBANKS, of St. Johnsbury, Caledonia county, in the State of Vermont, have invented certain new and useful Improvements relating to Scale-Platforms, of which the following is a specification:

The invention consists in improved means for widening the bearing-surface of the platform, as is frequently required in weighing bags of coffee and other long and yielding articles.

I provide sliding frames, each forming an entire skeleton side or wing, which, when out of use, may be moved inward, and be of no appreciable effect. When required, they are drawn out and form rigid wings or extensions on each side of the main platform, reaching out to a considerable distance. These frames or wings are adapted to serve without any addition in supporting the ends of a bag of coffee or corn, or like objects, which would otherwise sag and rest on the floor.

The following is a description of what I consider the best means of carrying out the invention.

The accompanying drawings form a part of this specification.

Figure 1 is a plan view of my improved platform with the top board removed. It represents one of the extensions drawn out, and the other thrust in. Fig. 2 is a vertical section through the parts in the same condition. Fig. 3 is a section on an enlarged scale, showing the slight notch or shoulder which I employ to hold the wing in the closed condition.

It will be understood that both the arms or slides from each wing are thus notched, and take hold thereby of the main body of the platform when the wing is out of use.

Similar letters of reference indicate like parts in the figures.

The figures represent the novel parts, with so much of the ordinary parts as is necessary to indicate their relation thereto. The levers and other parts constituting a platform-scale may be of any ordinary or suitable character.

A is the fixed framing, of cast-iron. B is the iron framing of the platform, and $b$ is the ordinary top board. B' B' are side frames, formed, as shown, of a length corresponding to the length of the platform, and the main part of each is adapted to match closely against the respective sides of the platform. Each is provided with two long slides, $b^1$ $b^1$, which fit in corresponding holes in the body B of the platform, with freedom to slide in and out as the wing requires to be extended or contracted. A stop, $b^2$, is provided on each of the slides $b^1$, to prevent the wing from being drawn out too far.

My wings increase the width of the platform very slightly when they are contracted or drawn, but give it a greatly-increased width when extended.

My wings are always attached, and their weight having been once counterbalanced requires no further attention.

The slides may be fitted so as to move quite tightly and avoid looseness. When thrust in there is nothing to move them out. A spring-catch or other device may be provided to secure them firmly, if desired.

I provide a slight shoulder, $c$, in the under face of each slide $b^1$, which engage and hold them tightly locked, and require them to be lifted slightly to allow their being drawn out.

I claim as my invention—

1. In scale-platforms, the wings B', extending parallel to the corresponding sides of platform B, and having each two or more slides, $b^1$, attached thereto, and moving simultaneously therewith, as herein specified.

2. The slides $b^1$, provided with the shoulders $c$, in combination with the main platform B, provided with staples or their equivalents on its lower face, adapted to engage with the shoulders, substantially as described.

3. The slides $b^1$, provided with shoulders $c$, and sliding each past its opposite one, in combination with the main platform B, and with the connecting-wings B', as herein specified.

In testimony whereof I have hereunto set my hand this 21st day of September, 1877, in the presence of two subscribing witnesses.

FRANKLIN FAIRBANKS.

Witnesses:
 E. D. BLODGETT,
 E. A. WALKER.